(12) United States Patent
Hayama et al.

(10) Patent No.: US 7,142,193 B2
(45) Date of Patent: Nov. 28, 2006

(54) COORDINATE INPUT DEVICE HAVING ROTATING BODIES CAPABLE OF ROTATING IN A DIRECTION NORMAL TO THE ROTATION OF A WHEEL

(75) Inventors: Masanobu Hayama, Tokyo (JP); Shuji Nakamura, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 0 days.

(21) Appl. No.: 09/478,799

(22) Filed: Jan. 7, 2000

(65) Prior Publication Data
US 2002/0180701 A1    Dec. 5, 2002

(30) Foreign Application Priority Data
Feb. 22, 1999  (JP)  ................... 11-042741

(51) Int. Cl.
  *G09G 5/08*  (2006.01)
(52) U.S. Cl. ...................... 345/163; 345/166
(58) Field of Classification Search ................ 345/163, 345/166, 156, 157, 165; 341/20
See application file for complete search history.

(56) References Cited

U.S. PATENT DOCUMENTS

| | | | | |
|---|---|---|---|---|
| 5,270,690 A | * | 12/1993 | Oberg | 345/163 |
| 5,442,377 A | * | 8/1995 | Rowe | 345/165 |
| 5,446,481 A | | 8/1995 | Gillick et al. | 345/163 |
| 5,479,190 A | * | 12/1995 | Rowe | 345/156 |
| 5,493,314 A | * | 2/1996 | Rowe | 345/156 |
| 5,530,455 A | | 6/1996 | Gillick et al. | 345/163 |
| 5,808,568 A | * | 9/1998 | Wu | 341/20 |
| 5,838,303 A | * | 11/1998 | Rowe | 345/157 |
| 5,912,661 A | * | 6/1999 | Siddiqui | 345/166 |
| 7,050,041 B1 | * | 5/2006 | Smith et al. | 345/156 |
| 2003/0137490 A1 | * | 7/2003 | Lee | 345/163 |

* cited by examiner

*Primary Examiner*—Amare Mengistu
(74) *Attorney, Agent, or Firm*—Staas & Halsey LLP

(57) ABSTRACT

A coordinate input device comprising a wheel operable through rotation includes a plurality of rotating bodies disposed along a circumferential edge of the wheel for rotation and a rotating body rotating state detection means for detecting the rotating state of the rotating bodies.

19 Claims, 16 Drawing Sheets

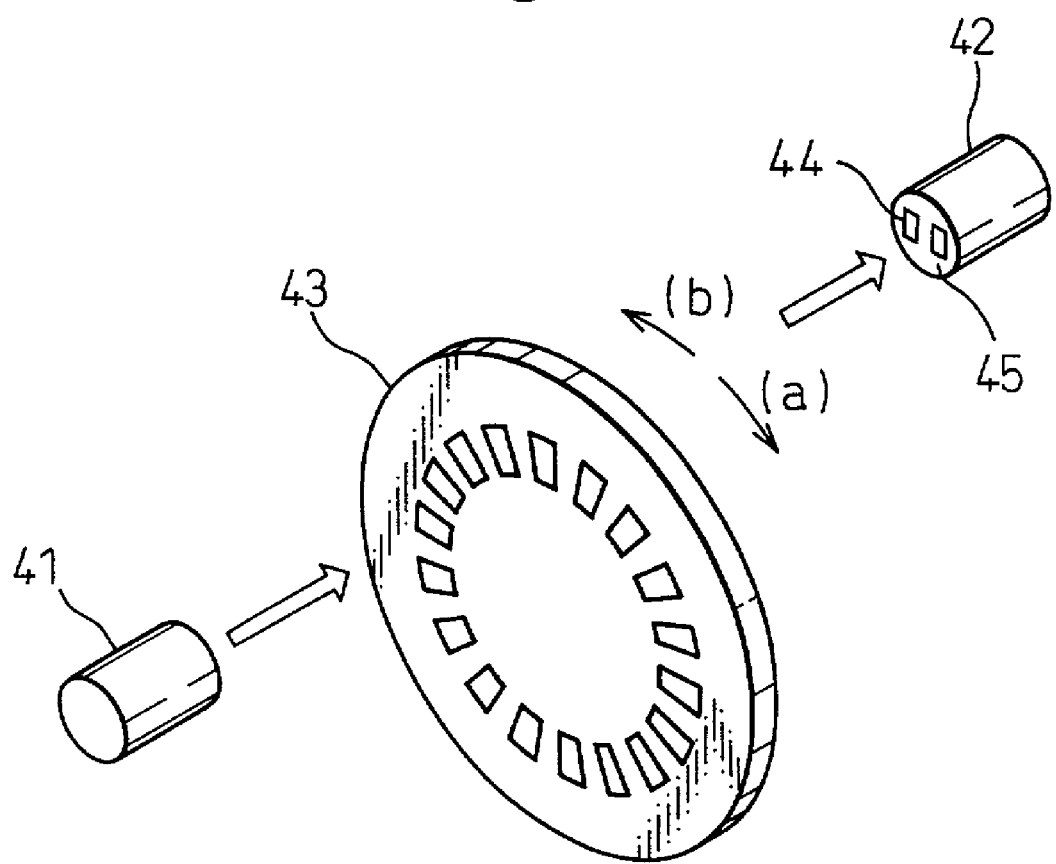

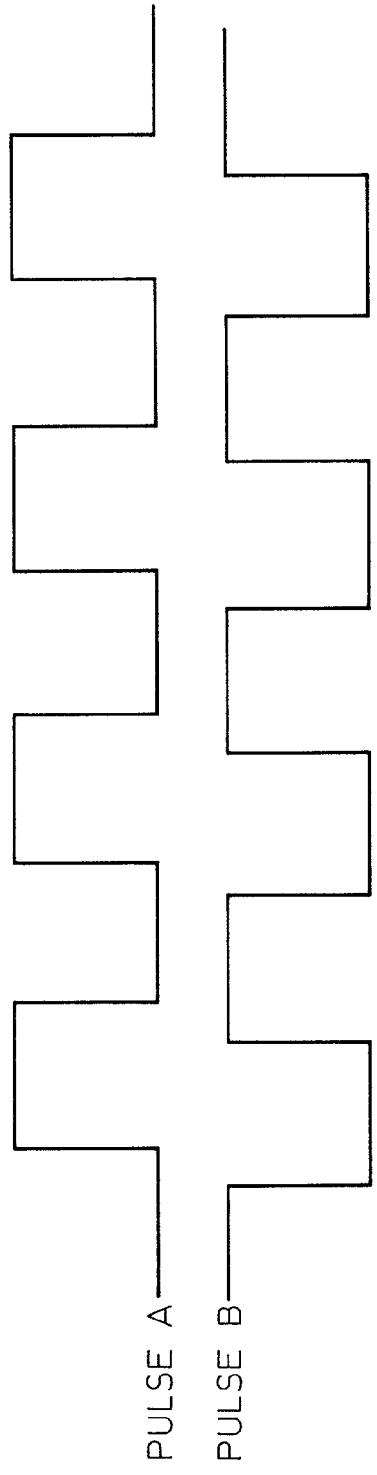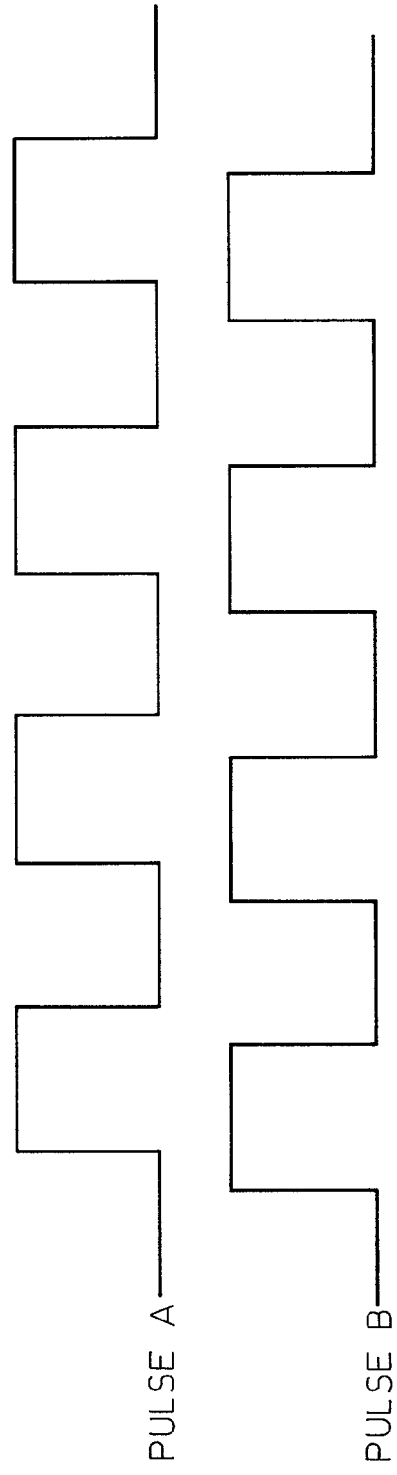

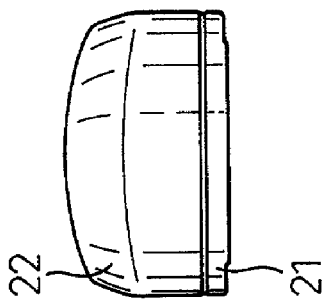
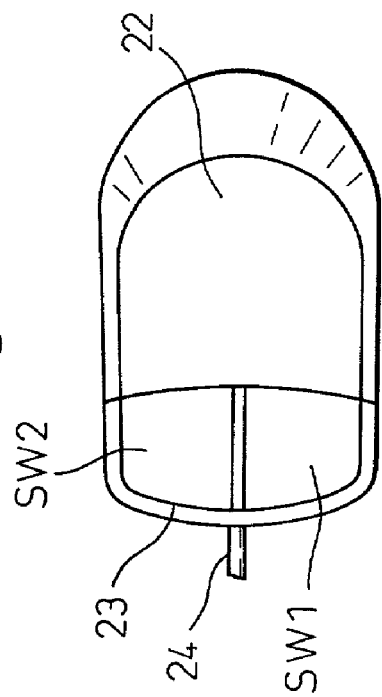
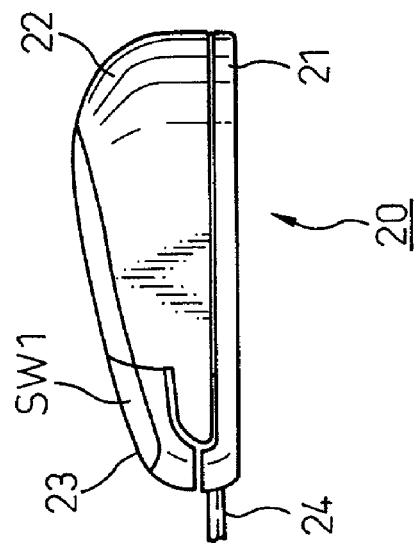
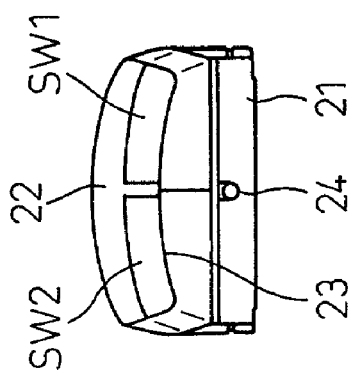

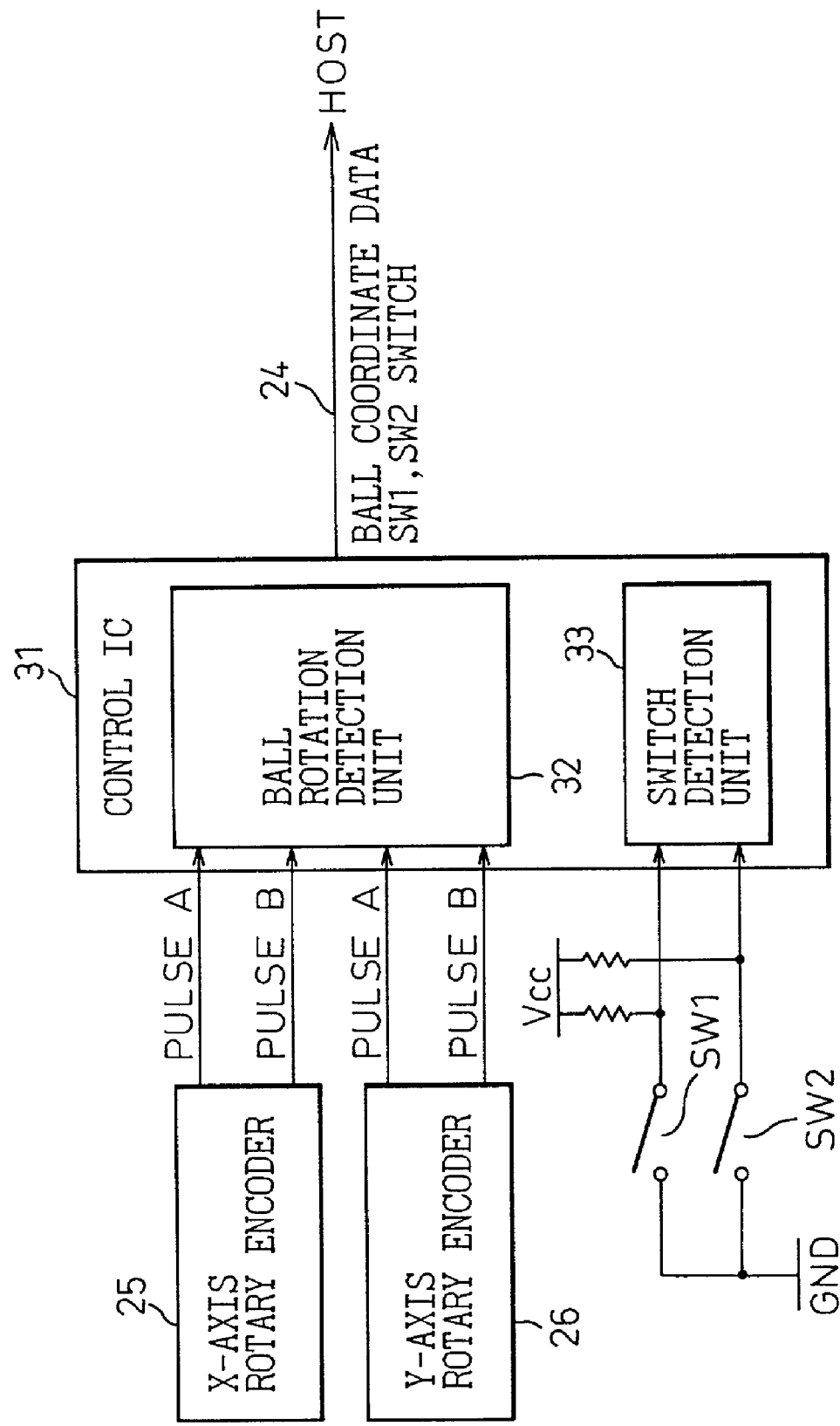

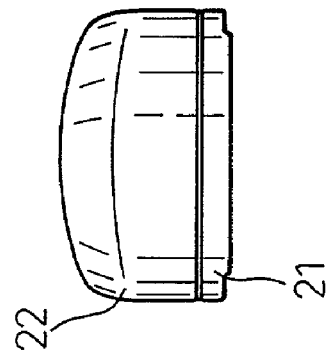
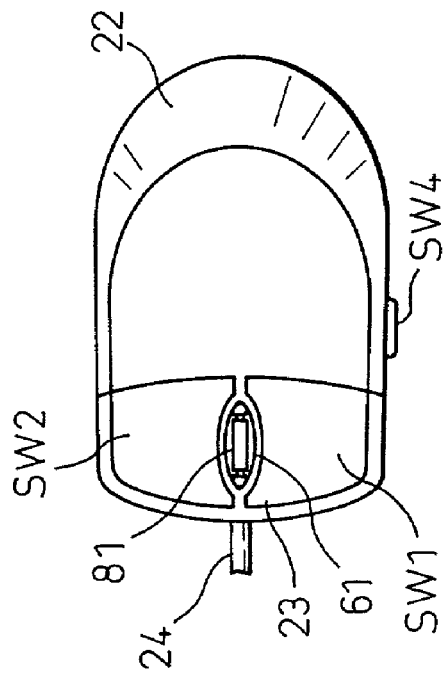
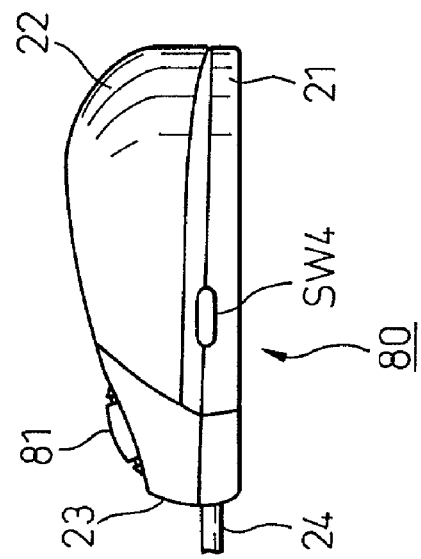
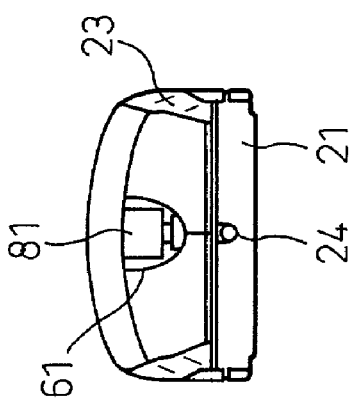

Fig. 14

| | FIRST BYTE | SECOND BYTE | THIRD BYTE | FOURTH BYTE | FIFTH BYTE |
|---|---|---|---|---|---|
| SW4 OFF NORMAL OUTPUT DATA | SW1,SW2,SW3 SWITCH DATA | BALL X-DIRECTION ROTATION DATA | BALL Y-DIRECTION ROTATION ENCODER | ROTATING BODY ROTATION DATA | WHEEL ROTATION DATA |
| SW4 ON OUTPUT DATA WITH SW4 BEING DEPRESSED | SW1,SW2,SW3 SWITCH DATA | ROTATING BODY ROTATION DATA | WHEEL ROTATION DATA | 0 | 0 |

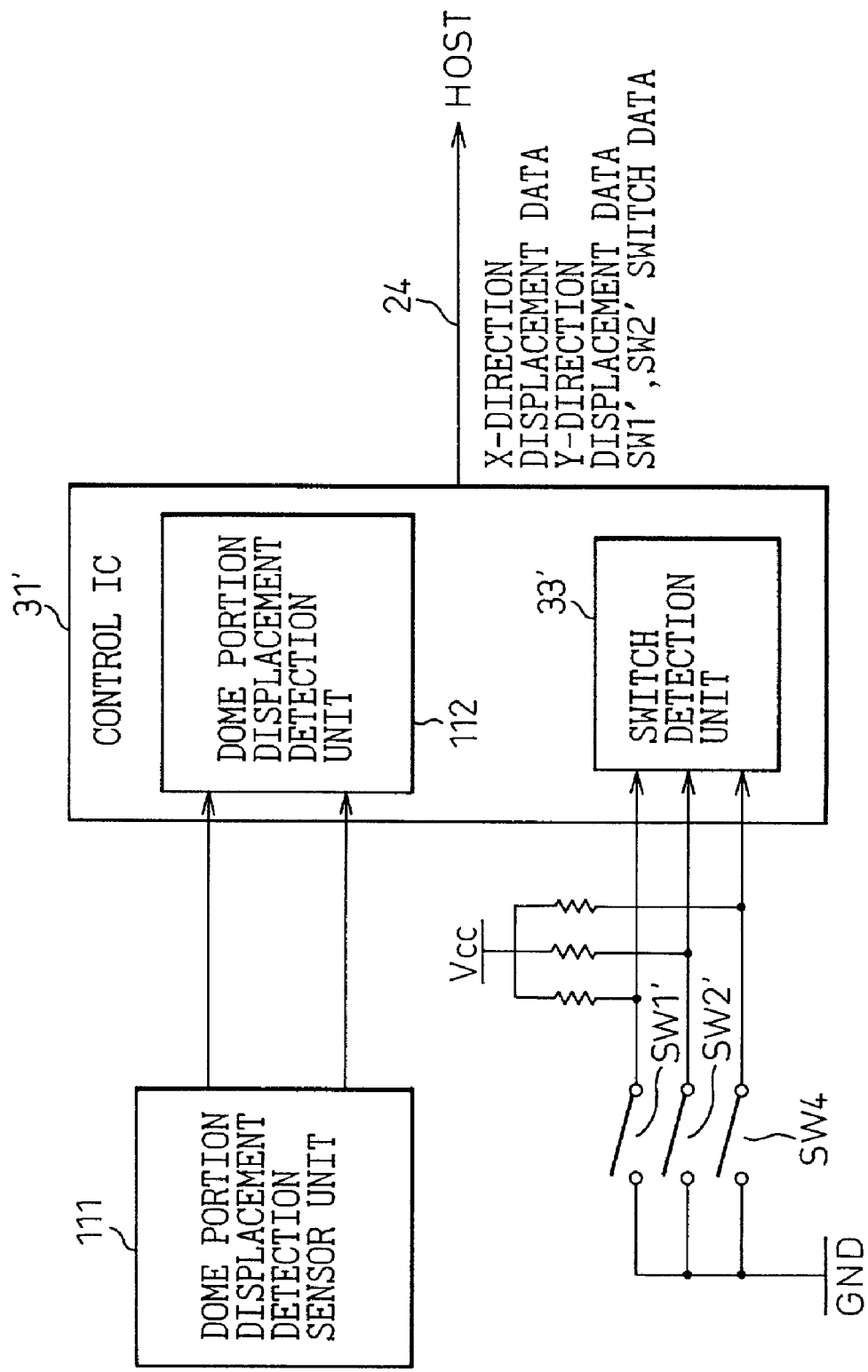

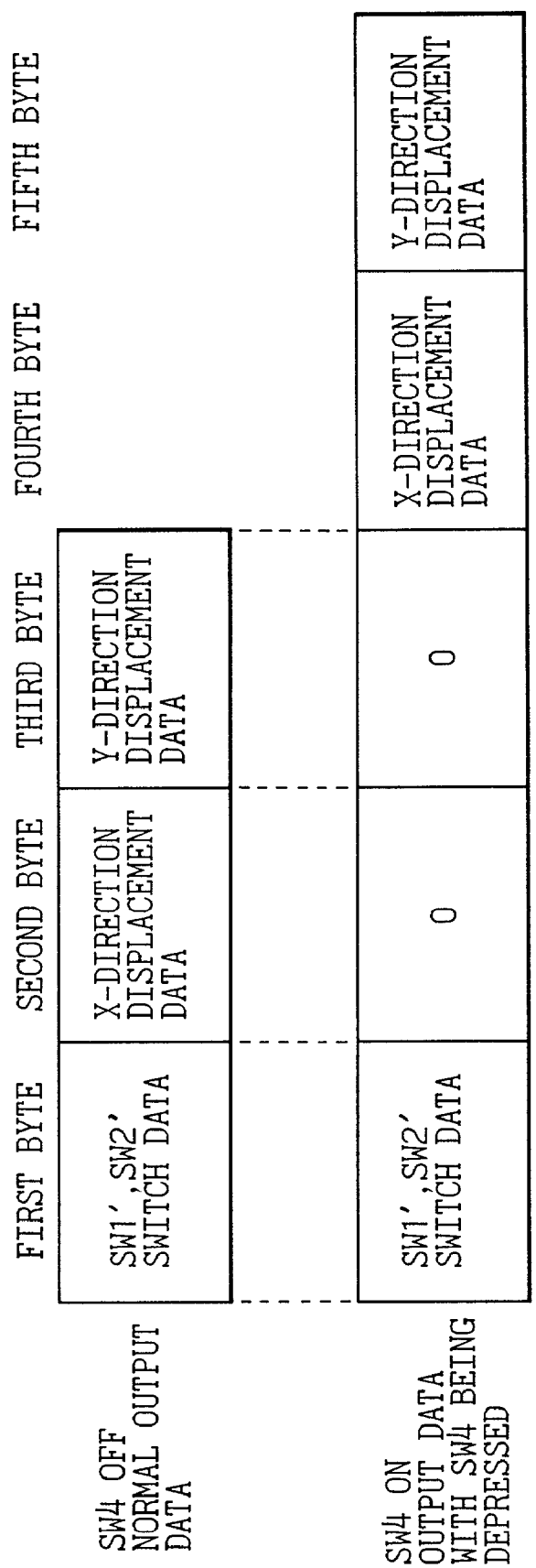

COORDINATE INPUT DEVICE HAVING ROTATING BODIES CAPABLE OF ROTATING IN A DIRECTION NORMAL TO THE ROTATION OF A WHEEL

BACKGROUND OF THE INVENTION

1. Field of the Invention

The present invention relates to a coordinate input device for facilitating the operation of a pointer for a display.

2. Description of the Related Art

In recent years, GUIs(graphical User Interfaces) have been adopted so as to improve the operability of PCs, and mice and other pointing devices are widely used to point to icons on a display screen.

Most mice that are now commonly used are of a type that is adapted to output operation distances of a mouse moved by the user in the X-axis and the Y-axis directions and the operations of two click switches thereon.

Directions in and distances over which a mouse travels are decomposed in the X-axis and the Y-axis directions for detection. A cursor displayed on the screen is moved in response to the results of the detection and when the cursor overlaps an icon, a click switch is operated to activate an operation corresponding to the icon.

A mouse with a wheel comprises the mouse described above and an additional wheel. In a mouse of this type, rotations obtained by operating the wheel can be allocated, for instance, to a scroll function to scroll an application software on the screen, and this can serve to simplify the operation of application software that has become more complicated in recent years.

The aforesaid mouse with a wheel can be operated only in one direction, and therefore, in a case where the wheel rotation data are allocated as a scroll function to scroll through an application software on the screen, scrolling is limited to only one direction. In this case, a scroll bar is still needed for scrolling in the other direction.

Furthermore, the operation of a cursor by moving the mouse sometimes becomes difficult in a place which is too narrow to move the mouse around. In such a case, in addition to a first operation method for moving the mouse, a second operation method is desired to be provided in which a result similar to that obtained with the first operation method can be obtained without moving the mouse around.

SUMMARY OF THE INVENTION

Consequently, in view of the above problem, a first object of the present invention is to provide a coordinate input device that can perform two different operations relative to an application software with first and second operation methods at normal times and which can perform the first operation with the second operation method where the first operation method cannot be used.

In addition, in view of the aforesaid problem, a second object of the present invention is to provide a coordinate input device having a switch for switching between a first operation method for moving around a mouse and a second operation method in which a result similar to that obtained with the first operation method can be obtained without moving the mouse around.

With a view to attaining the above objects, a first invention provides a mouse with a wheel having rotating bodies that are capable of rotating about a frame on each side of the wheel.

According to the present invention, the wheel can rotate, and additionally the rotating body can rotate in a direction normal relative to the rotation of the polygonal wheel.

In addition, with a view to attaining the above objects, a second invention provides a coordinate input device having a switch for switching data output formats that are sent to a host.

According to the present invention, data output formats can be switched with the switch.

BRIEF DESCRIPTION OF THE DRAWING

The present invention will be more clearly understood from the description as set forth below with reference to the accompanying drawings, wherein:

FIG. 2 is a first explanatory drawing regarding the detection of rotating directions and rotating distances of a slit disc;

FIGS. 3A and 3B are second explanatory drawings regarding the detection of rotating directions and rotating distances of the slit disc;

FIGS. 4A to 4D are a four-plane view of a conventional mouse;

FIG. 5 is a circuit diagram of the conventional mouse;

FIGS. 10A to 10D are a four-plane view of the mouse having a wheel with rotating bodies according to the first embodiment of the present invention;

FIG. 14 shows data output formats of the mouse having a wheel with rotating bodies according to the first embodiment of the present invention;

FIG. 16 is a circuit diagram of the pointing device having switches according to the fifth embodiment of the present invention; and FIG. 17 shows data output formats of the pointing device having switches according to the fifth embodiment of the present invention.

DESCRIPTION OF THE PREFERRED EMBODIMENTS

Before proceeding to a detailed description of the preferred embodiments, a prior art will be described with reference to the accompanying drawings relating thereto for a clearer understanding of the differences between the prior art and the present invention.

Figure 1:
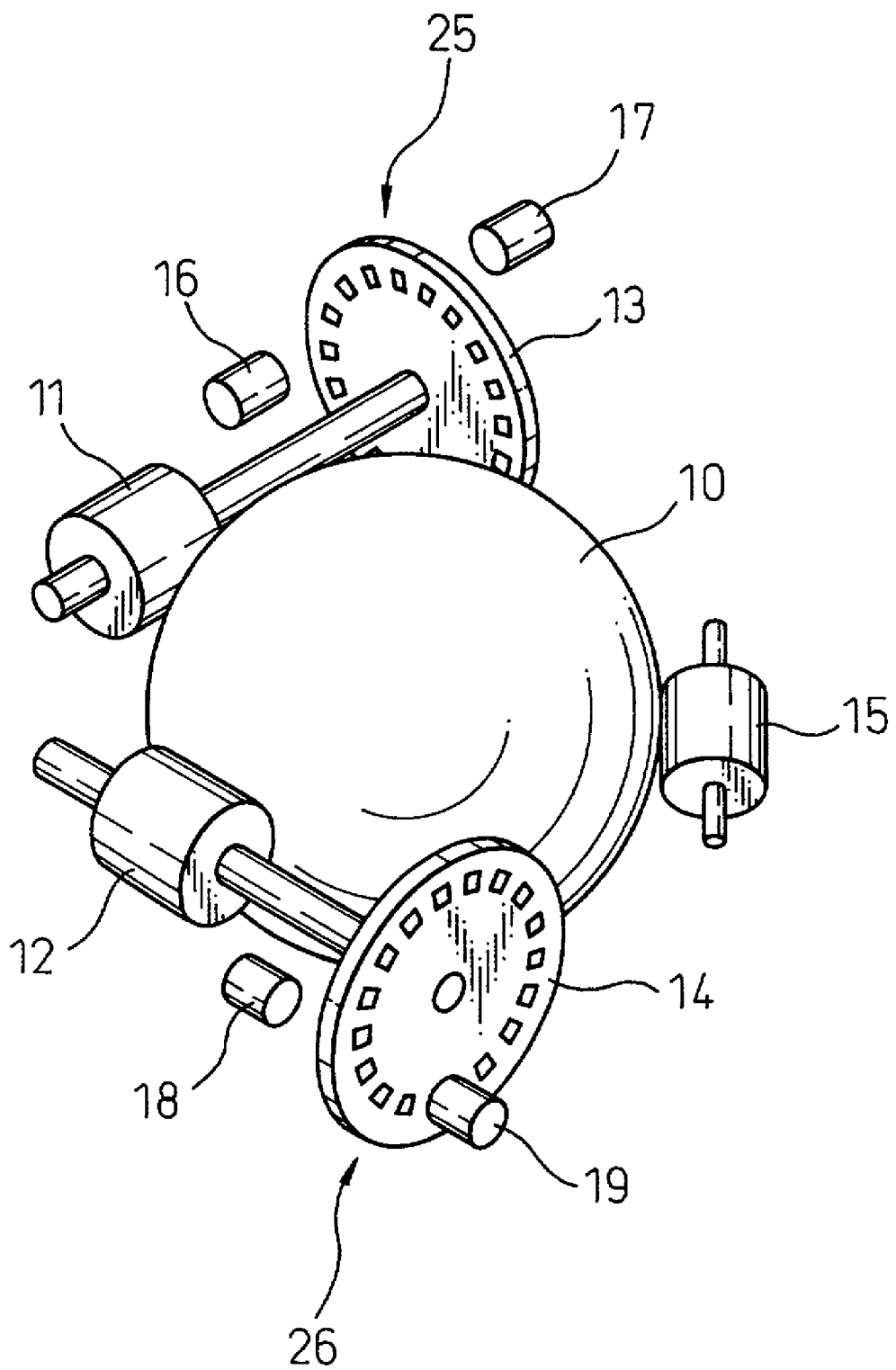
FIG. 1 is a principle drawing of a conventional mouse.

FIG. 1 is a principle drawing of a conventional mouse. A ball 10 rotates when the user operates the mouse. An X-direction shaft 11 and a Y-direction shaft 12 are disposed along an X-axis and a Y-axis that intersect at right angles relative to the ball 10 in such a manner as to come into contact with the ball 10. In order to maintain the contact between the ball 10 and the X-direction shaft 11 and the Y-direction shaft 12, a presser roller 15 is placed in a direction oriented at an angle of 45 degrees relative to the X-axis and the Y-axis.

An X-axis rotary encoder 25 and a Y-axis rotary encoder 26 are mounted, respectively, on distal end of the X-direction shaft 11 and the Y-direction shaft 12 for detection of the rotating directions and rotating distances of the ball 10 by decomposing them in the X-axis and Y-axis directions. The X-axis rotary encoder 25 comprises an X-axis slit disc 13, an X-axis light emitting device 16 and an X-axis light receiving device 17, and the Y-axis rotary encoder 26 comprises a Y-axis slit disc 14, a Y-axis light emitting device 18 and a Y-axis light receiving device 19. Slits are formed at predetermined angles in the X-axis slit disc 13 and the Y-axis slit disc 14, and light emitted from the X-axis light emitting device 16 and the Y-axis light emitting device 18 passes through the X-axis slit disc 13 and the Y-axis slit disc 14 and are then received by the X-axis light receiving device 17 and the Y-axis light receiving device 19, respectively.

FIGS. 2, 3A and 3B are explanatory drawings explaining detection, by the rotary encoder, of the travelling directions and distances of the mouse, that is, the rotating directions and distances of the X-direction shaft 11 and the Y-direction shaft 12. Here, for the sake of simplicity, a light emitting device 41, a light receiving device 42 and a slit disc 43 shown in FIGS. 2, 3A and 3B are regarded as corresponding, respectively, to the X-axis light emitting device 16 and the Y-axis light emitting device 18, the X-axis light receiving device 17 and the Y-axis light receiving device 19, and the X-axis slit disc 13 and the Y-axis slit disc 14 which are all shown in FIG. 1. In other words, with FIGS. 2, 3A and 3B rotations in both of the X-direction and the Y-direction can be described.

As shown in FIG. 2, two optical light receiving devices such as photoconductors 44, 45, are arranged in parallel within the light receiving device 42. As shown in FIGS. 3A, 3B, if it is assumed that pulses that are detected and converted into electric signals by the photoconductors 44, 45 are pulse A and pulse B, respectively, then, since the phase relation-ship between pulse A and pulse B is altered depending on the rotating direction of the slit disc 43, the rotating direction of the slit disc 43 can be detected.

FIGS. 4A to 4D are a four-plane view of a conventional mouse, in which FIG. 4A is a top plan view, FIG. 4B a front view, FIG. 4C a side view and FIG. 4D a rear view of the conventional mouse. The conventional mouse 20 is constructed by fitting a lower case 21 and an upper case 22 together, and thereafter inserting a key top 23 having incorporated therein click switches SW1, SW2 in a front of the upper case 22 so that the key top is fitted in the upper case 22, and the mouse is connected to the host via a cable 24.

FIG. 5 is a circuit diagram of the conventional mouse. The X-axis rotary encoder 25 and the Y-axis rotary encoder 26 are connected to a ball rotation detector unit 32 within a control IC 31 built into the mouse 20, and the left click switch SW1 and the right click switch SW2 are connected to a switch detector unit 33 within the control IC 31 built into the mouse.

The ball detector unit 32 within the control IC 31 detects the travelling direction and distance of the mouse 20 (hereinafter, referred to as ball coordinate data) from outputs from the X-axis rotary encoder 25 and the Y-axis rotary encoder 26, and the data so detected are then transmitted to the host via the cable 24.

A mechanical switch is used for the left click switch SW1 and the right click switch SW2 of the mouse. The control IC 31 constituted by a microprocessor transmits to the host, in a predetermined format, information representative of whether or not the click switches are depressed (hereinafter, referred to as SW1, SW2 switch data).

The travelling direction and distance of the mouse are decomposed in the X-axis and Y-axis for detection, a cursor displayed on the screen is moved in response to the result of the detection, and when the cursor overlaps with an icon, the click switches are operated to thereby activate an operation corresponding the icon so selected.

A mouse with a wheel comprises a mouse as described above and an additional wheel. With this mouse with a wheel, a rotation that can be obtained through operation of the wheel can be allocated, for instance, to a scroll function to scroll through an application software on the screen, thereby making it possible to simplify the operation of application software that has been getting more complicated in recent years.

Figure 6D:
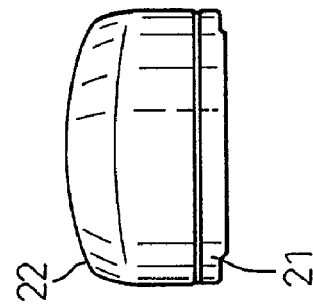
FIGS. 6A to 6D are a four-plane view of a conventional mouse with a wheel.
Figure 6A:
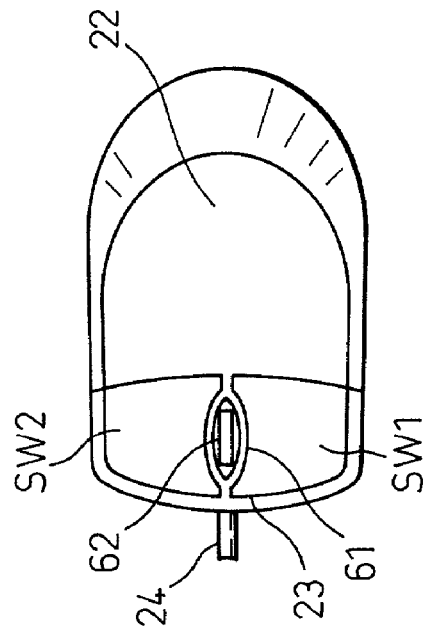
Figure 6C:
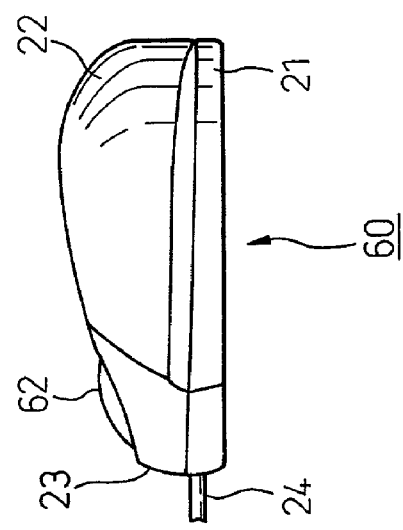
Figure 6B:
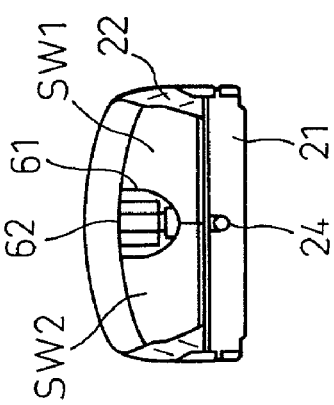

FIGS. 6A to 6D are a four-plane view of a conventional mouse with a wheel, in which FIG. 6A is a top plan view, FIG. 6B a front view, FIG. 6C a side view and FIG. 6D a rear view thereof. This conventional mouse with a wheel is constructed by fitting the lower case 21 and the upper case 22 together, and thereafter inserting in a front of the upper case 22 a key top 23 having incorporated therein the click switches SW1, SW2, so that the key top 23 can be fitted in the upper case 22. The mouse so constructed is then connected to the host via the cable 24. Furthermore, an opening 61 is formed in the center of the key top 23 and a part of a wheel 62 is exposed to the outside via the opening.

Figure 7:
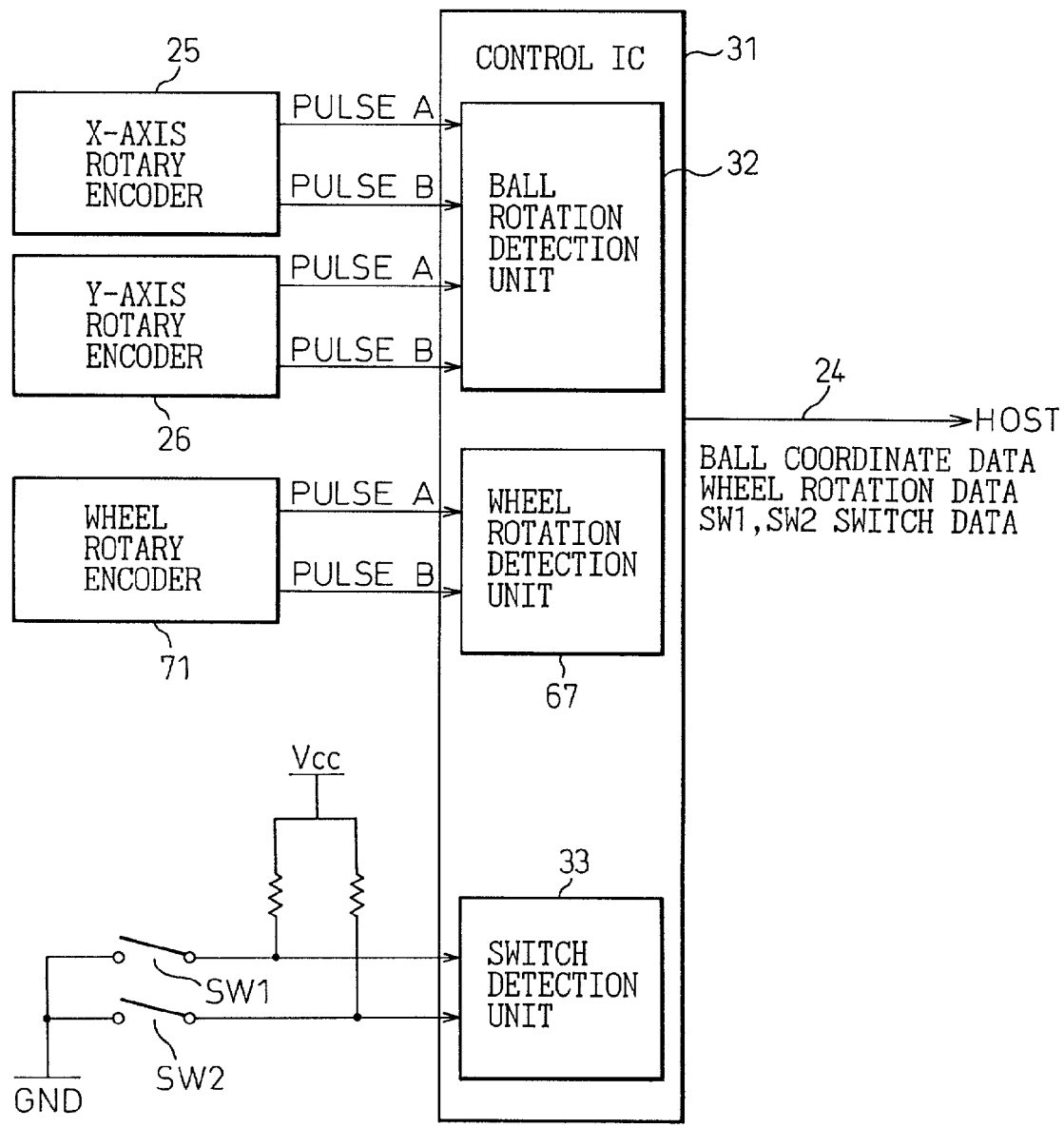
FIG. 7 is a circuit diagram of a conventional mouse with a wheel.

FIG. 7 is a circuit diagram of the conventional mouse with a wheel. A wheel rotary encoder 71 and a wheel rotation detector unit 67 are added to the circuit of the conventional mouse shown in FIGS. 3A and 3B.

Figure 8:
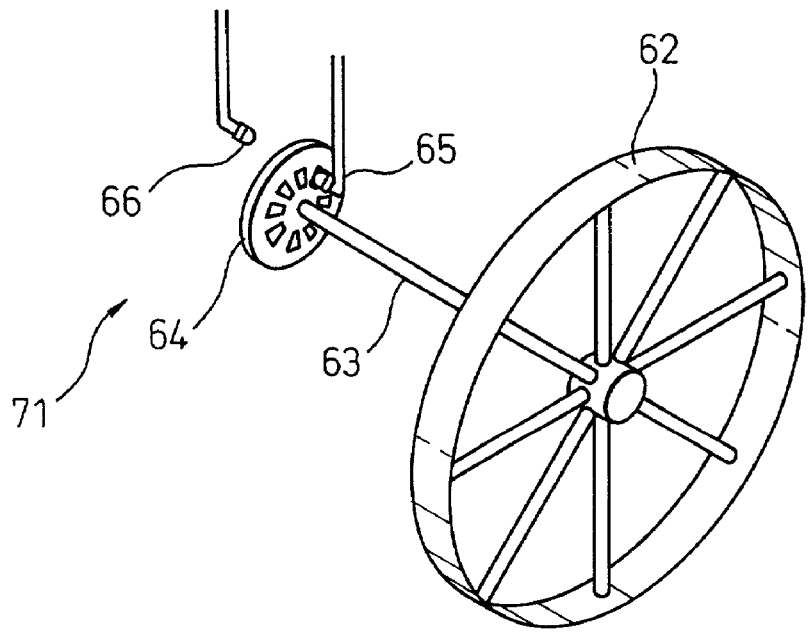
FIG. 8 is a perspective view showing the wheel construction of the conventional mouse with a wheel.

FIG. 8 is a perspective view showing a construction of the wheel of the conventional mouse with a wheel. A wheel 62 is connected via a wheel shaft 63 to the wheel rotary encoder 71 comprising a wheel light emitting device 65, a wheel light receiving device 66 and a wheel slit disc 64, and the rotating direction and distance of the wheel 62 is detected using a method similar to that described referring to FIGS. 2, 3A and 3B.

Information representative of the detected wheel rotating direction and distance (hereinafter, referred to as wheel rotation data) is transmitted to the host via the cable 24 in a predetermined format together with the ball coordinate data and the SW1, SW2 switch data.

In a case where this wheel rotation data are allocated, for instance, as a vertical scroll function to scroll an application software vertically on the screen, the application software can be scrolled on the screen by operating the wheel 62 with the finger of the user in a direction in which scrolling is to be performed without moving the cursor.

Figure 9:
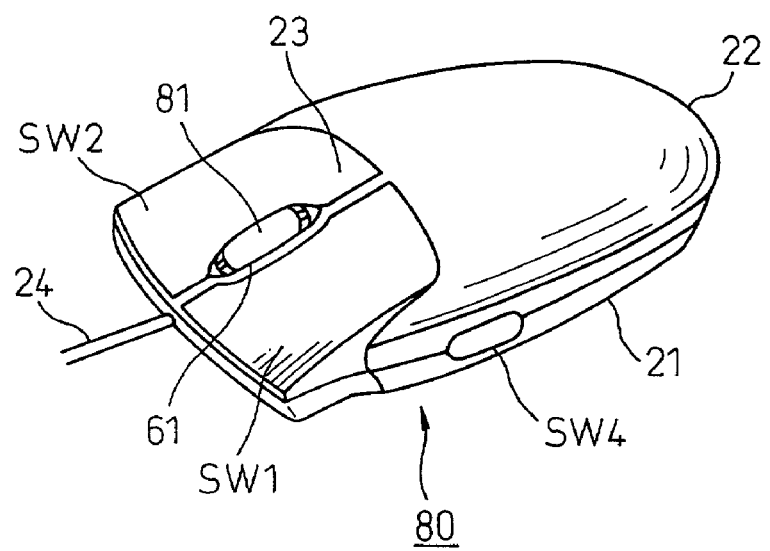
FIG. 9 is a perspective view of a mouse having a wheel with rotating bodies according to a first embodiment of the present invention.

FIG. 9 is a perspective view of a mouse having a wheel with rotating bodies according to a first embodiment of the present invention. In addition, FIGS. 10A to 10D are a four-plane view of the mouse having a wheel with rotating bodies according to the first embodiment of the present invention, in which FIG. 10A is a top plan view, FIG. 10B is a front view, FIG. 10C is a side view and FIG. 10D is a rear view thereof. A rear portion of the lower case 21 is covered with the upper case 22. In addition, a front portion of the lower case 21 is covered with the top key 23 having formed therein the left click switch SW1 and the right click switch SW2. Furthermore, the opening 61 is formed in the center of the key top 23, and a part of a wheel 81 with rotating bodies is exposed to the outside from the opening. An operation signal of the mouse 80 is transmitted to the host via the cable 24. A switch SW4 is provided on a side of the mouse.

Figure 11:
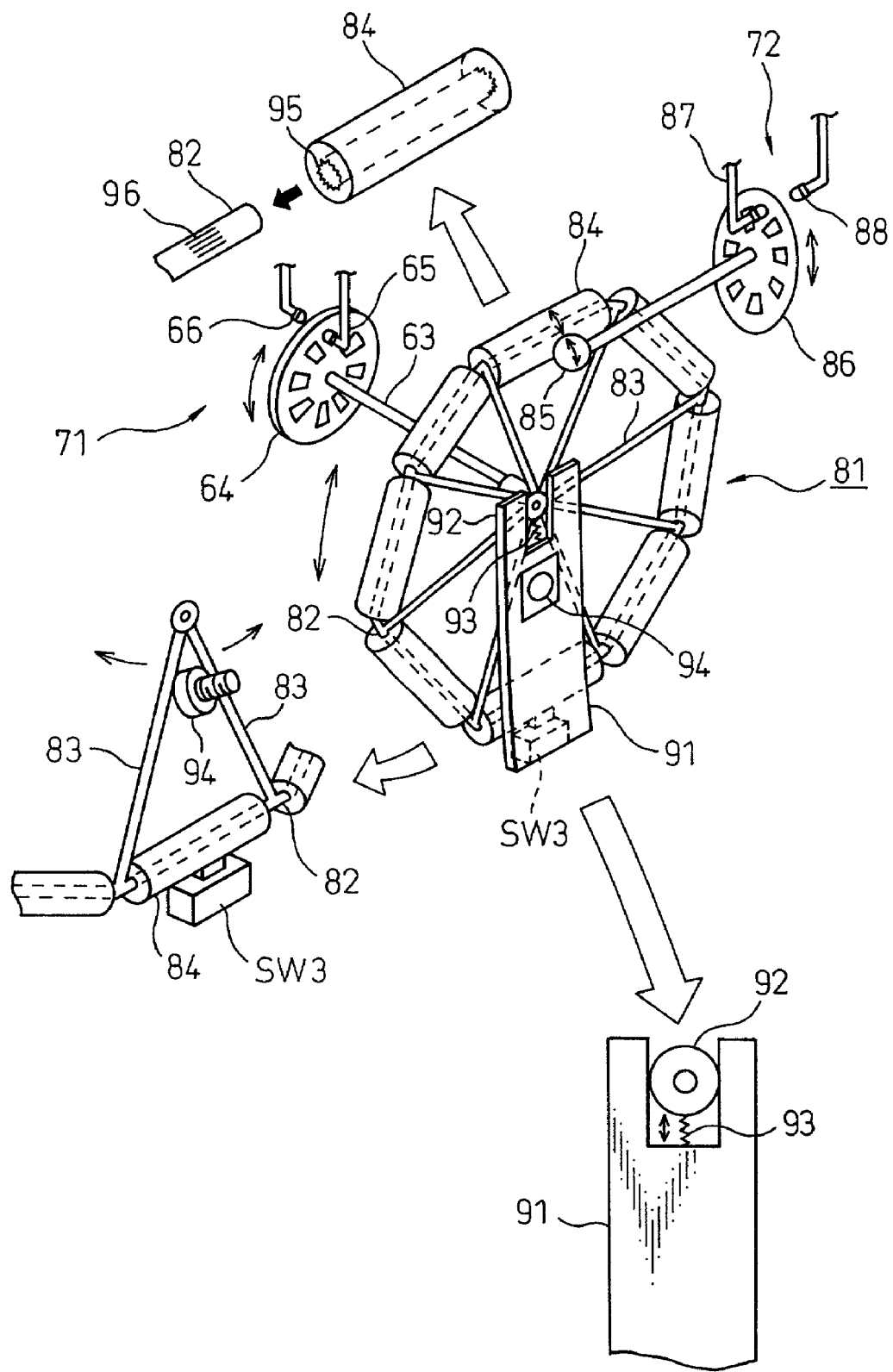
FIG. 11 is an exploded perspective view showing the construction of the wheel with rotating bodies provided on the mouse according to the first embodiment of the present invention.

FIG. 11 is an exploded perspective view of the mouse having a wheel with rotating bodies according to the first embodiment of the present invention. In this embodiment, the wheel has a polygonal configuration, but the configuration of the wheel is not limited thereto. The wheel 81 with rotating bodies comprises a polygonal wheel 82, spokes 83 connecting respective vertexes of the polygonal wheel 82 to the center thereof and a rotating body 84 and can rotate about the wheel shaft 63. The rotating body 84 can rotate about a frame of each side of the polygonal wheel 82. In this embodiment, the polygonal wheel 82 is of an octagonal configuration, but the configuration of the wheel is not regulated thereto. In addition, in this embodiment, the rotating body 84 is of a cylindrical configuration but, as will be described later, there is no limit to the configuration thereof.

The rotating body 84 resting on a frame that is positioned uppermost among the frames of the polygonal wheel 82 is exposed to the outside from the opening 61 formed in the center of the key top 23 of the mouse 80, and the user can rotate the polygonal wheel 82 and the rotating body 84 with his or her finger.

A central portion 92 of the polygonal wheel 82 is supported on a wheel supporting portion 91, and a switch SW3 is disposed at a lower portion of the wheel 81 with rotating bodies. The central portion 92 of the polygonal wheel 82 is supported on the wheel support portion 91 via a slide mechanism 93 adapted to slide in vertical directions. In this embodiment, the slide mechanism takes the form of a spring.

When the user presses down the wheel 81 with rotating bodies exposed from the opening 61 with his or her finger, the polygonal wheel 82 is then slid and the rotating body 84 depresses the switch SW3. The switch SW3 can be allocated a function of a middle click of a so-called three-button mouse.

The polygonal wheel 82 is connected via the wheel shaft 63 to the wheel rotary encoder 71 comprising the wheel light emitting device 65, the wheel light receiving device 66 and the wheel slit disc 64, and the rotating direction and distance of the polygonal wheel 82 are detected in a similar method to the one described referring to FIGS. 2, 3A and 3B. The wheel rotation data representative of the detected rotating direction and distance of the polygonal wheel 82 are then transmitted to the host via the cable 24.

The rotating body 84 resting on a frame that is positioned uppermost among the frames of the polygonal wheel 82 is in contact with a spherical shaft 85, which is connected to a rotating body rotary encoder 72 comprising a rotating body light emitting device 87, a rotating body light receiving device 88 and a rotating body slit disc 86. When the user touches the rotating body 84 with his or her finger so as to rotate it, the spherical shaft 85 is rotated in response the rotation of the rotating body by the user and the rotating body slit disc 86 is then rotated. Thus, the rotating direction and distance of the rotating body 84 can be detected in a method similar to that described with reference to FIGS. 2, 3A and 3B.

The information representative of the detected rotating direction and distance of the cylindrical rotating body 84 (hereinafter, referred to as rotating body rotation data) is then transmitted in a predetermined format to the host via the cable 24 together with the ball coordinate data, the wheel rotation data, and the switch data SW1, SW2, SW3.

Figure 12:
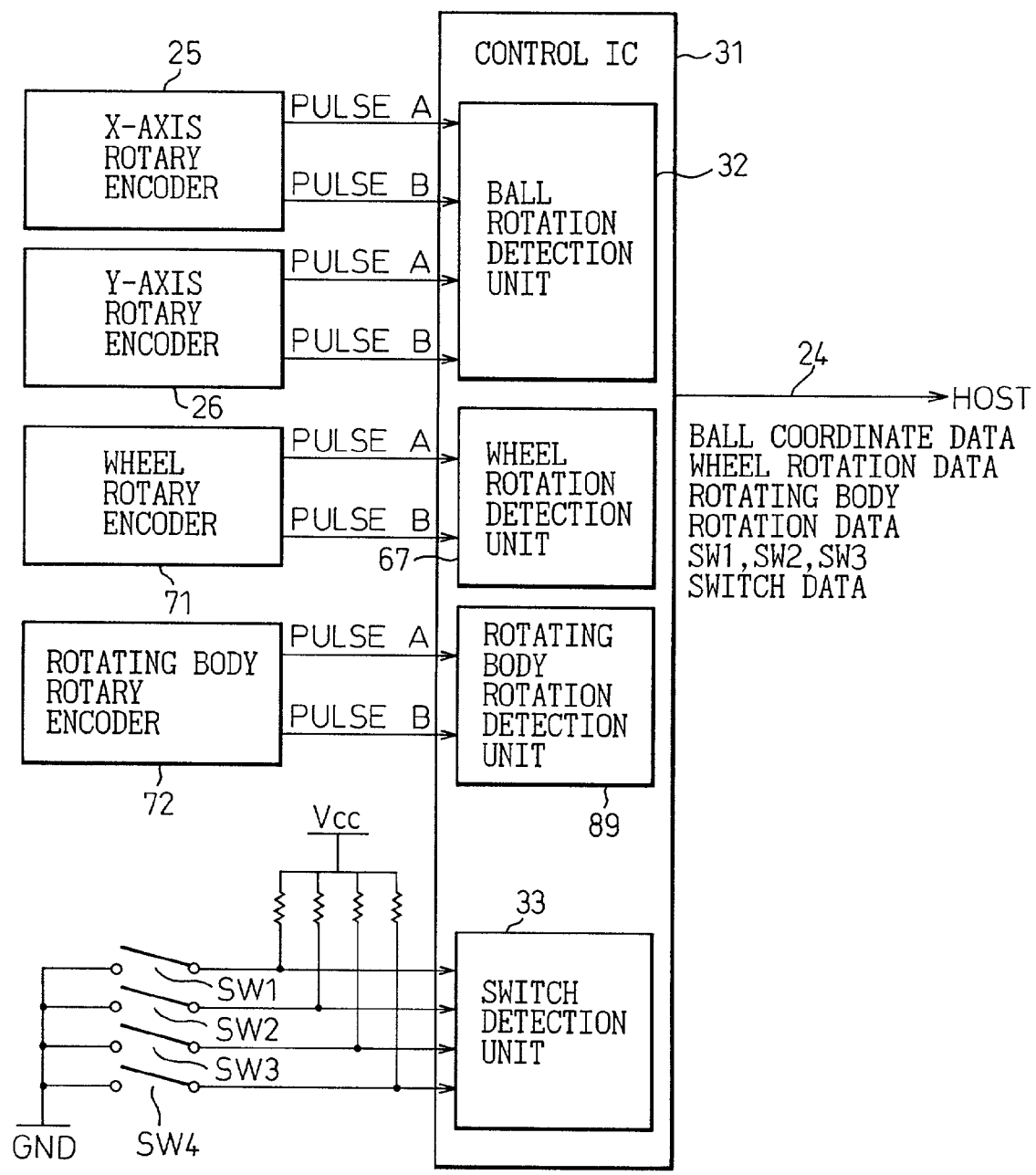
FIG. 12 is a circuit diagram according to the first embodiment of the present invention.

FIG. 12 is a circuit diagram of the first embodiment of the present invention, in which the rotating body rotary encoder 72, a rotating body rotation detector unit 89, the switch SW3 and a switch SW4 are added to the circuit of the conventional mouse with a wheel shown in FIG. 7.

In the mouse 80 according to the present invention, a click feeling, which will be described below, is imparted to be felt in rotationally operating the polygonal wheel 82 and the rotating body 84 of the wheel 81 with rotating bodies with the finger of the user's hand in order to have a rough idea on the operating distance of the wheel 81 with rotating bodies.

First of all, as to the polygonal wheel 82, the click feeling is imparted by providing at least an elastic projection 94 at the wheel support portion 91 such that the projection is caught between the respective spokes of the polygonal wheel 82. This projection 94 is effective to fix the position of the polygonal wheel 82.

Then, as to the rotating body 84, the click feeling is imparted by providing a recessed and raised construction 95 in the interior of the rotating body 84 and also providing a projection 96 having a certain degree of elasticity on each of the frames of the respective sides of the polygonal wheel 83. In addition, in this embodiment, the rotating body 84 takes the form of a cylinder, but it is needless to say that it is possible to construct the rotating body 84, irrespective of the configuration thereof, so as to impart the click feeling.

Figure 13C:
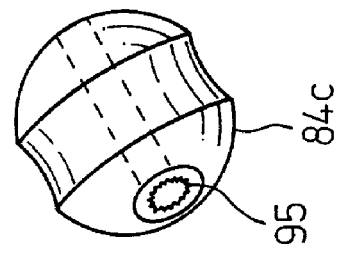
FIGS. 13A to 13C show drawings of rotating bodies according to other embodiments.
Figure 13B:
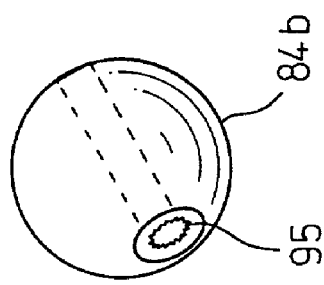
Figure 13A:
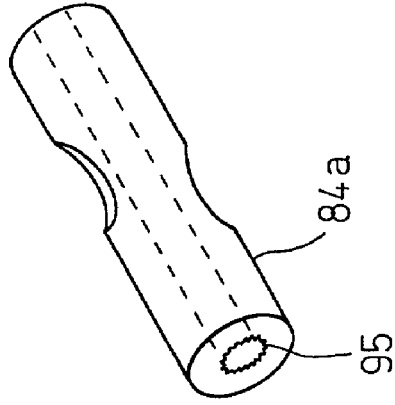

FIGS. 13A to 13C show drawings of other embodiments of the rotating body according to the present invention. A second embodiment shown in FIG. 13A provides a cylindrical rotating body 84a having formed therein recessed portions so that the fingers are caught thereat, a third embodiment shown in FIG. 13B provides a spherical rotating body 84b, and a fourth embodiment shown in FIG. 13C provides a spherical rotating body 84c having formed therein a recessed portion. However, other configurations may be used.

In addition, the surface of the rotating body 84 may be covered with a resin, such as a rubber, providing friction in order to reduce the slippage encountered when the wheel 81 with rotating bodies is operated with the finger of the user.

FIG. 14 shows data output formats of the mouse having a wheel with rotating bodies according to the first embodiment of the present invention. The upper part of FIG. 14 shows a normal output format in which a first byte represents the SW1, SW2 and SW3 switch data, a second byte the ball X-direction rotational data, a third byte the ball Y-direction, a fourth byte the rotating body rotational data and a fifth byte the ball Y-direction rotation data, and these data are sent to the host sequentially via the cable 24.

Since the mouse cursor is moved by operating the rotating body wheel according to the present invention without moving the mouse main body in a place which is too narrow to move around the mouse, in the present invention there is provided a switch SW4 for changing over the aforesaid data output formats.

In a case where the wheel 81 with the rotating body is operated by with the finger while depressing the format change-over switch SW4, for instance the data is sent in the format shown in the lower part of FIG. 14 to the host via the cable 24. The first byte represents the SW1, SW2 and SW3 switch data, the second byte the rotating body rotational data, the third byte the wheel rotational data, and the fourth and fifth bytes are not used. In the normal data output format, the second byte represents the ball X-direction rotational data and the third byte represents the ball Y-direction rotational data, and therefore by depressing the switch SW4 the mouse cursor can be moved through the operation of the wheel with the rotating body.

In addition to the mouse, there exists a pointing device as a coordinate input device, and the aforesaid format change-over switch SW4 can be applied to the pointing device.

Figure 15:
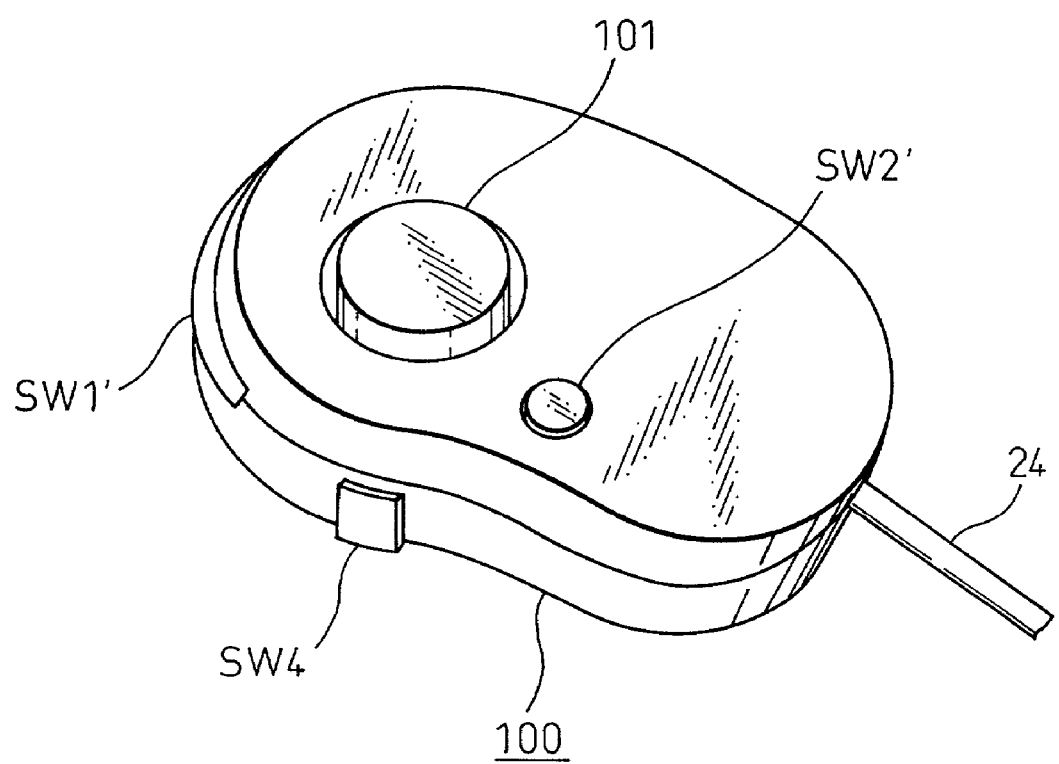
FIG. 15 is a perspective view of a pointing device having switches according to a fifth embodiment of the present invention.

FIG. 15 is a perspective view of a pointing device having a format change-over switch according to a fifth embodiment of the present invention.

A pointing device 100 is adapted to output a displacement data by inclining a dome portion 101 with the finger of the user's hand. In this embodiment, there are provided a first switch SW1' and a second switch SW2' corresponding, respectively, to the functions of the left click switch and the right click switch of the above-described mouse, and the format change-over switch SW4 is provided on a side of the pointing device 100.

FIG. 16 is a circuit diagram of the pointing device having the format change-over switch according to the fifth embodiment of the present invention. A dome portion displacement detection sensor unit 111 is connected to a dome portion displacement detector unit 112 inside a control IC 31', and this control IC 31' transmits to the host, via the cable 24, the displacement direction and distance of the dome portion 100 detected by the dome portion displacement detection sensor unit 111 as X-direction displacement data and Y-direction displacement data. The first switch SW1' and the second switch SW2' are connected to a switch detector portion 33' within the control IC 31' built in the pointing device 100. The control IC 31' transmits to the host, via the cable 24, the SW1', SW2' switch data which are information representative of operating states of the first switch SW1' and the second switch SW2' together with the X-direction displacement data and the Y-direction displacement data.

FIG. 17 shows data output formats of the pointing device provided with the format change-over according to the fifth embodiment of the present invention. The respective data are sent to the host, via the cable 24, in the format shown in the upper part of FIG. 17. A first byte of the data output format represents the SW1', SW2' switch data, a second byte the X-direction displacement data of the dome portion 101, and a third byte the Y-direction displacement data of the dome portion 101.

In a case where the dome portion 101 is operated with the change-over switch SW4 being depressed, the respective data are transmitted to the host via the cable 24 in a format such as shown in the lower part of FIG. 17. A first byte represents the SW1', SW2' switch data, second and third bytes are not used, a fourth byte represents the X-direction displacement data of the dome portion 101, and a fifth byte the Y-direction displacement data of the dome portion 101. In a case where the output data obtained when the change-over switch SW4 is depressed are allocated as a vertical and horizontal scroll function to scroll through the application software in vertical and horizontal directions on the screen, when the dome portion 101 is operated with the finger so as to be inclined in a direction in which the application software is to be scrolled on the screen with the change-over switch being depressed, a scrolling of the application software on the screen can be effected without moving the cursor.

As has been described heretofore, according to the present invention, in the mouse with the wheel, rotating directions and distances that are normal to each other at right angles can be obtained by means of the wheel with the rotating body, and in a case where rotations of the two axes obtained through operation of the wheel with the rotating body are allocated as the vertical and horizontal scroll function to scroll through the application software on the screen in vertical and horizontal directions, it is possible to perform scrolling-up, -down, -left and -right with ease by operating the wheel with the rotating body with the finger.

In addition, it is possible to switch the data output formats for transmitting data to the host by providing the format change-over switch on the coordinate input device, and in the mouse having the wheel with the rotating body, rotations of the wheel with the rotating body that are perpendicular to each other can be allocated for instance as the scrool function to scroll through an application software on the screen. In other coordinate input devices such as a pointing device, a scroll of an application software on the screen is made possible without moving the cursor. It is needless to say that the change-over switch can be used to change over other functions.

What is claimed is:

1. A coordinate input device having a polygonal wheel having plural sides, as a circumferential edge thereof, and which is rotatable about a first axis, comprising:

a plurality of rotating bodies, each of the rotating bodies disposed along a corresponding one of the plural sides and rotating along with the corresponding one of the plural sides of said polygonal wheel about the first axis and each of the rotating bodies rotatable about the corresponding one of the plural sides of said polygonal wheel as a second axis, which is different from the first axis such that the polygonal wheel and the plurality of rotating bodies rotate about the first axis;

rotating body rotating state detection means for detecting a rotating state of said rotating bodies;

wheel rotating state detection means for detecting a rotating state of said polygonal wheel;

a format change-over switch; and data transmission means for transmitting information detected by each of said respective detection means as a set of operation instructions for a computer and adapted to effect transmission in a first format when said format change-over switch is not depressed and to effect another transmission in a second format when said format change-over switch is depressed.

2. The coordinate input device as set forth in claim 1, wherein said coordinate input device has a left click switch as a first switch and a right click switch as a second switch, said coordinate input device further comprising:

a third switch disposed as a lower portion of said polygonal wheel;

a wheel support portion having a construction to support said polygonal wheel and to allow said polygonal wheel to slide and adapted to drive said third switch by depressing said polygonal wheel downwardly; and third switch operating state detection means for detecting the operating state of said third switch.

3. The coordinate input device as set forth in claim 2, wherein said wheel support portion further comprises a ratchet construction on a side of said polygonal wheel, and wherein said polygonal wheel is adapted to fit in said ratchet construction.

4. The coordinate input device as set forth in claim 1, wherein an inner wall at a center of said respective rotating bodies through which said circumferential edge of said polygonal wheel is put has a locking construction, and wherein said circumferential edge of said polygonal wheel is adapted to fit in a second locking construction.

5. The coordinate input device as set forth in claim 1, wherein said rotating body is of a cylindrical configuration.

6. The coordinate input device as set forth in claim 1, wherein said rotating body is of a spherical configuration.

7. The coordinate input device as set forth in claim 1, wherein a surface of said rotating bodies is covered with a slip preventive material.

8. The coordinate input device as set forth in claim 1, wherein a recess is formed in a surface of said rotating bodies.

9. The coordinate input device as set forth in claim 1, wherein said coordinate input device further comprises:
    ball moving state detection means for detecting a moving state of a ball; and
    click switch operating state detection means for detecting an operating state of a click switch.

10. A coordinate input device having a polygonal wheel having plural sides, as a circumferential edge thereof, and which is rotatable about a first axis, comprising:
    a plurality of rotating bodies, each of the rotating bodies disposed along a corresponding one of the plural sides and rotating along with the corresponding one of the plural sides of said polygonal wheel about the first axis and each of the rotating bodies rotatable about the corresponding one of the plural sides of said polygonal wheel as a second axis, which is different from the first axis such that the polygonal wheel and the plurality of rotating bodies rotate about the first axis;
    ball moving state detection means for detecting a moving state of a ball;
    click switch operating state detection means for detecting an operating state of a click switch;
    wheel rotating state detection means for detecting a rotating state of said polygonal wheel;
    a format change-over switch; and
    data transmission means for transmitting respective pieces of information detected by said respective detection means as a set of operation instructions for a computer and adapted to effect transmission in a first format when said format change-over switch is not depressed and to effect another transmission in a second format when said format change-over switch is depressed.

11. A coordinate input device having a polygonal wheel having plural sides, as a circumferential edge thereof, and which is rotatable about a first axis, comprising:
    a plurality of rotating bodies, each of the rotating bodies disposed along a corresponding one of the plural sides and rotating along with the corresponding one of the plural sides of said polygonal wheel about the first axis and each of the rotating bodies rotatable about the corresponding one of the plural sides of said polygonal wheel as a second axis, which is different from the first axis such that the polygonal wheel and the plurality of rotating bodies rotate about the first axis;
    rotating body rotating state detection means for detecting a rotating state of said rotating bodies;
    a wheel rotating state detection unit detecting a rotating state of said polygonal wheel;
    a format change-over switch; and
    a data transmission unit transmitting information detected by each of said respective detection units as a set of operation instructions for a computer and adapted to effect transmission in a first format when said format change-over switch is not depressed and to effect another transmission in a second format when said format change-over switch is depressed.

12. The coordinate input device as set forth in claim 11, wherein said coordinate input device has a left click switch as a first switch and a right click switch as a second switch, said coordinate input device further comprising:
    a third switch disposed as a lower portion of said polygonal wheel;
    a wheel support portion to support said polygonal wheel and to allow said polygonal wheel to slide and adapted to drive said third switch by depressing said polygonal wheel downwardly; and
    a third switch operating state detection unit detecting the operating state of said third switch.

13. The coordinate input device as set forth in claim 12, wherein said wheel support portion further comprises a ratchet construction on a side of said polygonal wheel, and wherein said polygonal wheel is adapted to fit in said ratchet construction.

14. The coordinate input device as set forth in claim 11, wherein an inner wall at a center of said respective rotating bodies through which said circumferential edge of said polygonal wheel is put has a locking construction, and wherein said circumferential edge of said polygonal wheel is adapted to fit in a second locking construction.

15. The coordinate input device as set forth in claim 11, wherein said rotating body is of a cylindrical configuration.

16. The coordinate input device as set forth in claim 11, wherein said rotating body is of a spherical configuration.

17. The coordinate input device as set forth in claim 11, wherein a surface of said rotating bodies is covered with a slip preventive material.

18. The coordinate input device as set forth in claim 11, wherein a recess is formed in a surface of said rotating bodies.

19. A coordinate input device having a polygonal wheel having plural sides, as a circumferential edge thereof, and which is rotatable about a first axis, comprising:
    a plurality of rotating bodies, each of the rotating bodies disposed along a corresponding one of the plural sides and rotating along with the corresponding one of the plural sides of said polygonal wheel about the first axis and each of the rotating bodies rotatable about the corresponding one of the plural sides of said polygonal wheel as a second axis, which is different from the first axis such that the polygonal wheel and the plurality of rotating bodies rotate about the first axis;
    a rotating body rotating state detection unit detecting a rotating state of said rotating bodies;
    a ball moving state detection unit detecting a moving state of a ball;
    a click switch operating state detection unit detecting an operating state of a click switch;
    a wheel rotating state detection unit detecting a rotating state of said polygonal wheel;
    a format change-over switch; and
    a data transmission unit transmitting respective pieces of information detected by said respective detection units as a set of operation instructions for a computer and adapted to effect transmission in a first format when said format change-over switch is not depressed and to effect another transmission in a second format when said format change-over switch is depressed.

* * * * *